(12) United States Patent
Sarnoff et al.

(10) Patent No.: US 10,499,765 B2
(45) Date of Patent: Dec. 10, 2019

(54) NESTED PANS

(71) Applicant: Handi-Foil Corporation, Wheeling, IL (US)

(72) Inventors: Norton Sarnoff, Northbrook, IL (US); Brad Sarnoff, Chicago, IL (US); Raj Patel, Lake Zurich, IL (US)

(73) Assignee: Handi-Foil Corporation, Wheeling, IL (US)

( * ) Notice: Subject to any disclaimer, the term of this patent is extended or adjusted under 35 U.S.C. 154(b) by 61 days.

(21) Appl. No.: 14/085,994

(22) Filed: Nov. 21, 2013

(65) Prior Publication Data
US 2015/0136633 A1 May 21, 2015

(51) Int. Cl.
*A47J 36/24* (2006.01)

(52) U.S. Cl.
CPC .................... *A47J 36/2405* (2013.01)

(58) Field of Classification Search
CPC ........ A47J 27/10; A47J 36/24; A47J 36/2405; A47J 36/2433; A47J 36/2438; B65D 21/0233
USPC .................. 206/499, 518–519; 219/385, 537; 220/23.86, 23.87, 23.88, 23.89, 573.4, 220/573.5
See application file for complete search history.

(56) References Cited

U.S. PATENT DOCUMENTS

| | | | | |
|---|---|---|---|---|
| 1,974,186 A | * | 9/1934 | Kollman | A21B 3/134 126/390.1 |
| 3,407,079 A | * | 10/1968 | Griffith | B65D 85/62 206/499 |
| 5,347,979 A | * | 9/1994 | Haber | A47J 36/2405 126/33 |
| 5,467,697 A | * | 11/1995 | Hunziker | A47J 27/10 126/33 |
| 6,267,111 B1 | * | 7/2001 | Burton | B60P 3/0257 108/156 |
| 6,415,945 B1 | * | 7/2002 | Zank | A47J 27/12 206/499 |
| 6,462,312 B1 | * | 10/2002 | Feagley | A47J 27/17 219/433 |

(Continued)

OTHER PUBLICATIONS

CIPO Office Action dated Jul. 28, 2015 on corresponding CA Patent Application 2840353.

(Continued)

*Primary Examiner* — Anthony D Stashick
*Assistant Examiner* — Kaushikkumar A Desai
(74) *Attorney, Agent, or Firm* — Adam K. Sacharoff; Much Shelist, P.C.

(57) ABSTRACT

There is provided a combination of nested pans for use in warming and cooking foods. The combination includes a first pan and a second pan. The second pan has a base portion terminating to an upwardly extending continuously surrounding sidewall. The sidewall has an upper edge that extend outwardly to a rim. The second pan further has an inside angle defined between the base portion of the upwardly extending sidewall, and wherein the continuously surrounding sidewall defines a pair of oppositely positioned short sides and a pair of oppositely positioned long sides interspaced between the short sides. The length of the short side of the pan is configured to permit at least three pans to nest side by side within the first pan.

2 Claims, 12 Drawing Sheets

(56) References Cited

U.S. PATENT DOCUMENTS

2009/0250473 A1   10/2009   Bois et al.

OTHER PUBLICATIONS

CA App. 2840353, copending Canadian Application filed Jan. 21, 2014; Notice of Allowance dated Apr. 11, 2017; along with CIPO Application information particulars to show relationship to US Application.

* cited by examiner

NESTED PANS

FIELD OF THE INVENTION

The present invention relates to the art of steam pans and similar items, and more particularly, the present invention is directed to properly nesting steam pans to help alleviate accidents by the consumer.

BACKGROUND OF THE INVENTION

Steam pans are typically foil pans used by consumers to keep food warm while catering and serving individuals. The steam pans utilize a bottom pan that is placed on a rack which lifts the bottom pan off the grand at a distance which permits the user to place candles or burners under the pan to keep the pan warm. Water is then placed in the bottom pan, which is heated by the burners. A smaller pan or multiple smaller pans with food are then nested within the bottom pan. The burners which are warming the water will then keep the food warm/hot while it is being served to the consumer.

The problems with the current system are easily identified as the prior art is explained.

SUMMARY OF THE INVENTION

In accordance with one embodiment of the present invention, there is provided a combination of nested pans for use in warming and cooking foods. The combination is defined by having a first pan having a first base portion terminating to an upwardly extending continuously surrounding first sidewall, the first sidewall has an upper edge that extend outwardly to a first rim, and wherein the first sidewall of the first pan has a first height, and wherein and the first pan further having a first inside angle defined between the first base portion of the upwardly extending first sidewall. The combination further includes a second pan having second base portion terminating to an upwardly extending continuously surrounding second sidewall, the second sidewall has an upper edge that extend outwardly to a second rim, and the second pan further having a second inside angle defined between the second base portion of the upwardly extending second sidewall, and wherein the continuously surrounding second sidewall defines a pair of oppositely positioned short sides and a pair of oppositely positioned long sides interspaced between the short sides. The length of the short side of the second pan is configured to permit at least three second pans to nest side by side within the bottom pan.

In other aspects the second sidewall of the second pan may have a second height less than the first height of the first pan; the second inside angle may be within two degrees of the inside angle of the first pan; or the length of the short side of the second pan may be configured to cause a portion of the second rim along the short side of the second pan to rest on a portion of the first rim of the first pan.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 1A:
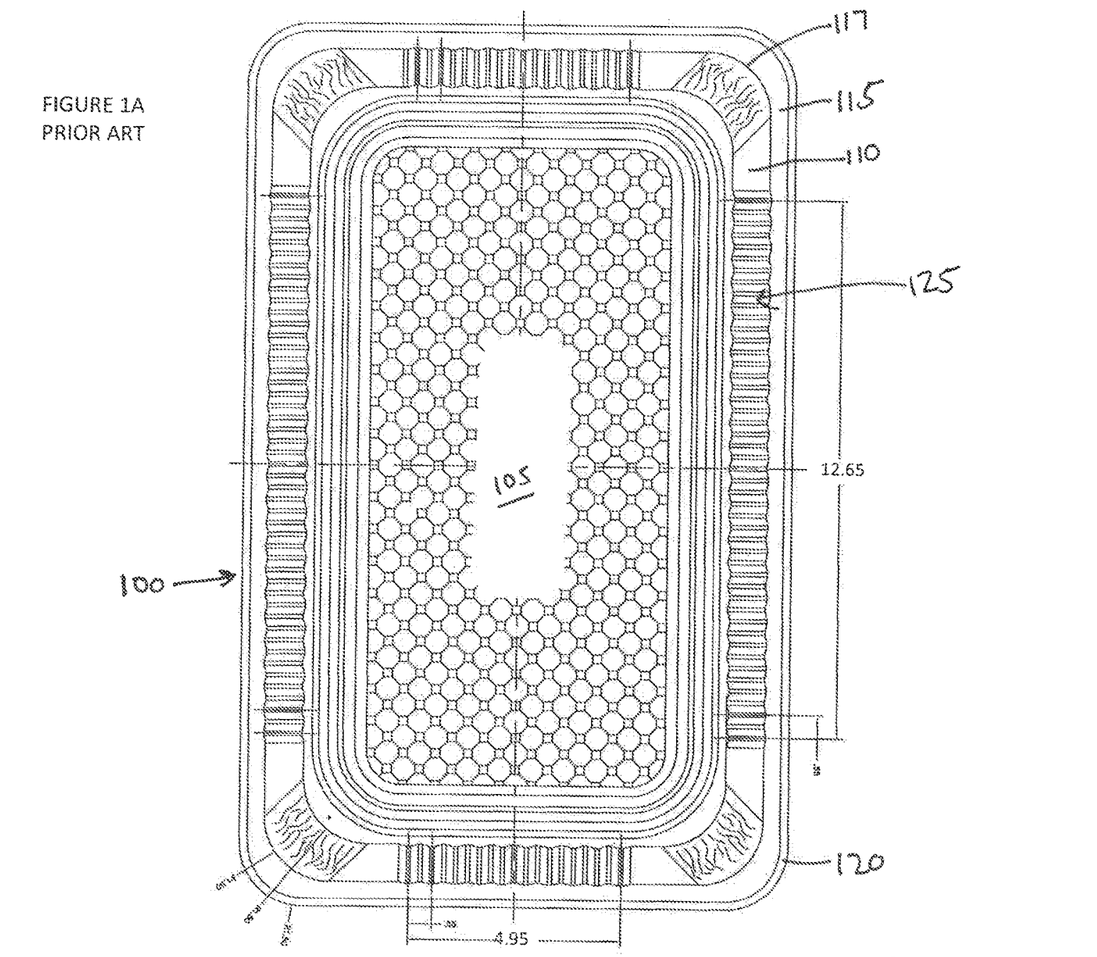
FIG. 1A is a top view of a Prior Art steam pan sized to be positioned as the bottom pan.
Figure 1B:
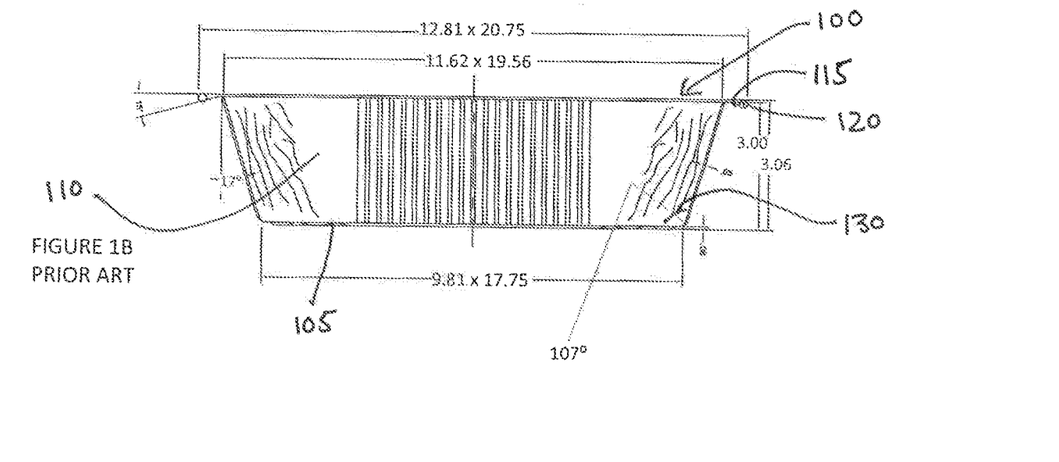
FIG. 1B is the side view of the Prior Art bottom pan from FIG. 1A.

With reference to PRIOR ART FIGS. 1A and 1B, there is provided a steam pan 100 sized to be positioned as a bottom pan that typically rests on a platform that would permit the user to place a burner or candle underneath the bottom pan. The bottom pan 100 includes a bottom base 105 that terminates to an upwardly extending continuous sidewall 110. Surrounding a top portion of the sidewall 110 is an outstanding rim 115 that terminate to a rolled bead 120. The pan is typically made of stamped aluminum. The approximate dimensions of the bottom base are 9.81"×17.75" and the approximate dimensions of the interior 125 of the bottom pan taken from the inside edge 117 of the outstanding rim 115 is 11.62"×19.56". With a height of approximately 3 inches the inside angle 130 between the bottom base 105 and the upwardly extending continuous sidewall 110 is about 107°.

Figure 2A:
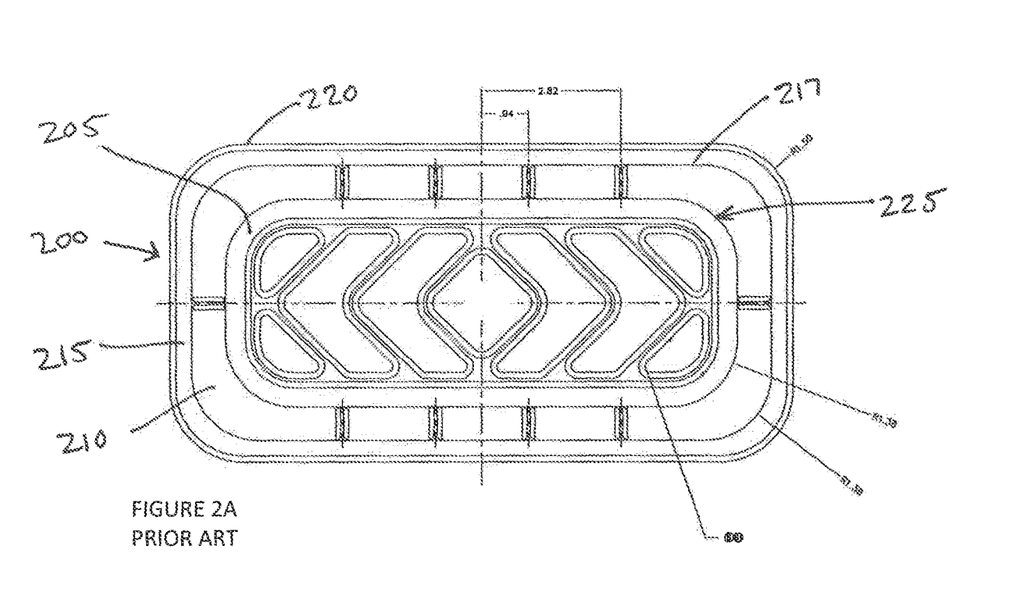
FIG. 2A is a top view of a Prior Art loaf pan sized to be approximately ⅓ of the length of the bottom pan
Figure 2B:
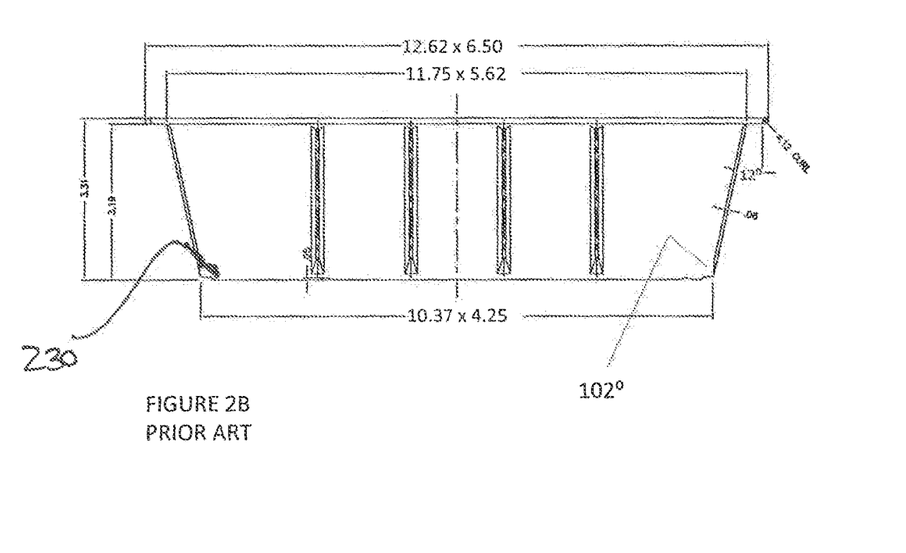
FIG. 2B is a side view of the Prior Art loaf pan from FIG. 2A

Referring now to Prior Art FIGS. 2A and 2B there is shown a loaf pan 200 well known and used in the cooking industry. The loaf pan 200 is generally sized from baking breads and has similar aspects of the bottom pan 100. The loaf pan 200 includes a loaf base 205 that terminates to an upwardly extending continuous sidewall 210. Surrounding a top portion of the sidewall 210 is an outstanding rim 215 that terminates to a rolled bead 220.

The approximate dimensions of the loaf base are 10.37"×4.25" and the approximate dimensions of the interior 225 of the loaf pan 200 taken from the inside edge 217 of the outstanding rim 215 is 11.75"×5.62". With a height of approximately 3.19" the inside angle 230 between the loaf base 205 and the upwardly extending continuous sidewall 210 is about 102°.

Figure 2C:
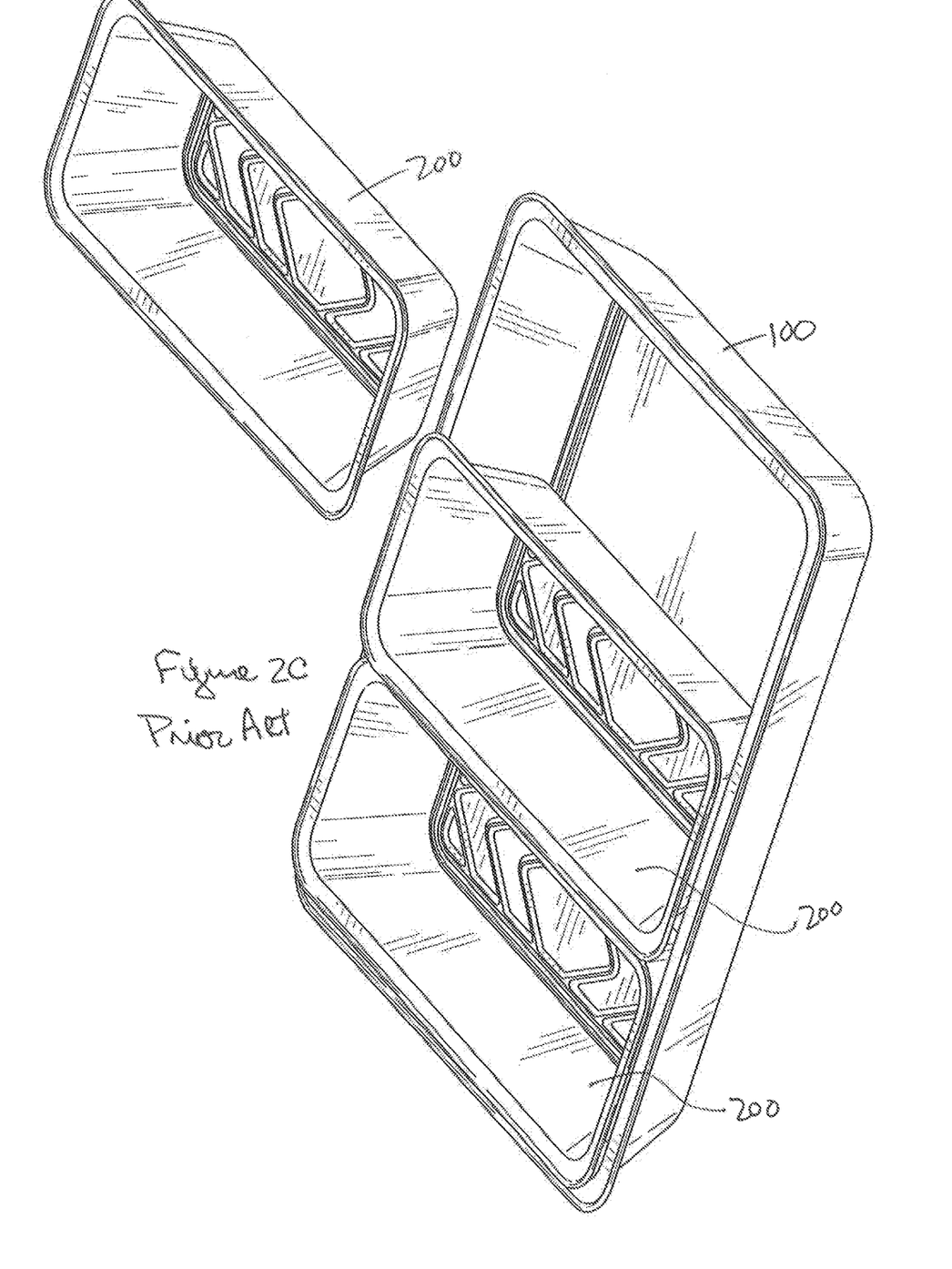
FIG. 2C is a perspective view of multiple Prior Art loaf pans from FIG. 2A being used with the Prior Art bottom pan from FIG. 1A and further illustrating one of the Prior Art loaf pans separated from the others.
Figure 2D:
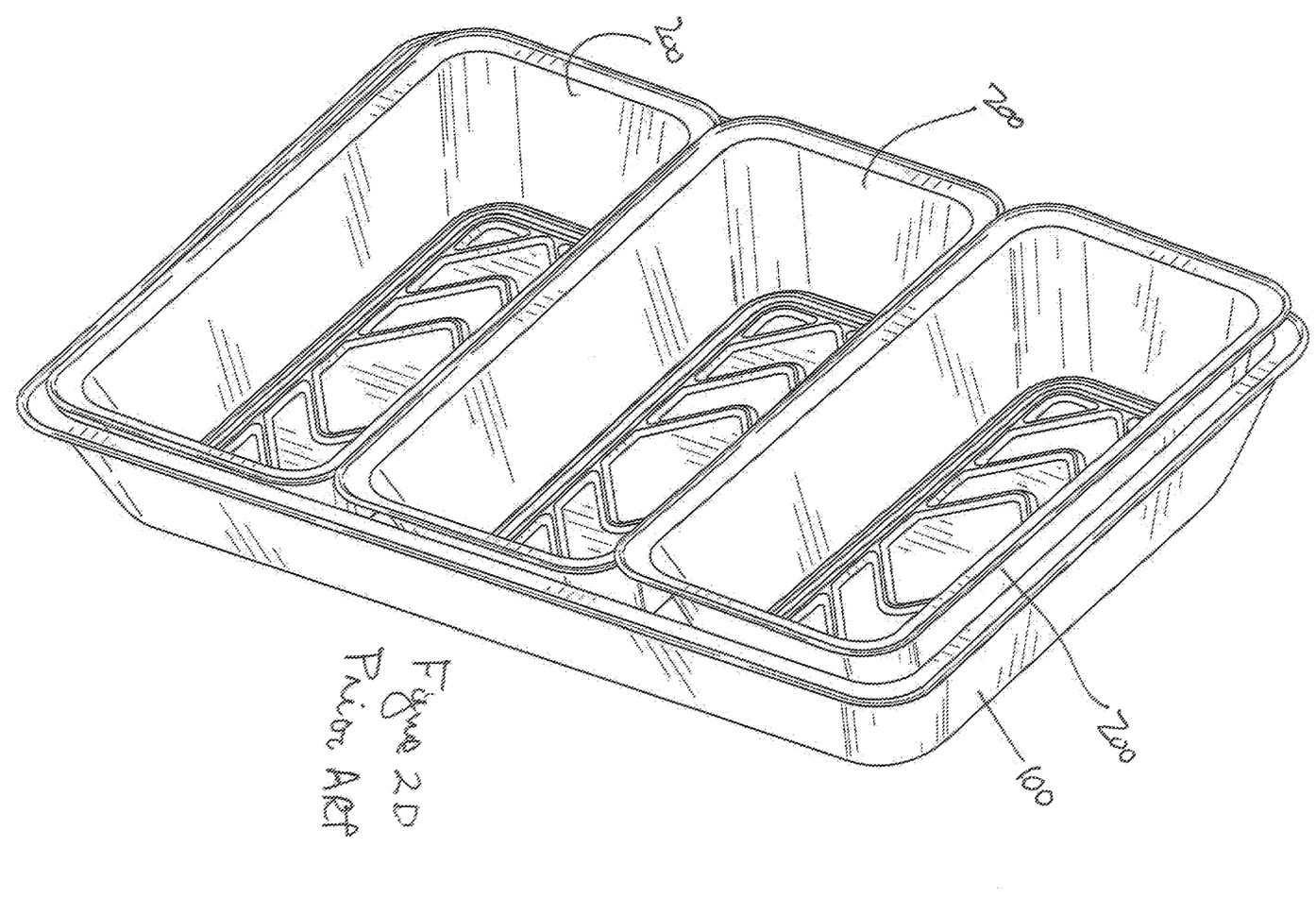
FIG. 2D is a perspective view of the multiple Prior Art loaf pans nested within the Prior Art bottom pan from FIG. 1A.

While not designed to be used with the bottom pan consumers often use the loaf pan because it has a relative size of about ⅓ of the bottom pan. As illustrated in Prior Art FIGS. 2C and 2D, when the loaf pan is nested in the bottom pan, a portion of the pan extends past the outstanding rim 115 of the bottom pan 100 such that the loaf pan is not supported. This can lead to spills and injury if a consumer spills hot food on themselves or another person. There are multiple reasons why the loaf pan does not properly fit in the bottom pan. First, the size of the loaf base 205 causes the loaf base 205 to make contact with the sidewall 110 of the bottom pan preventing it from being positioned near the bottom base 105. Second, the height of the loaf pan is larger than the height of the bottom pan. Lastly, the inside angle 230 of the loaf pan 200 is about 5° smaller than the inside angle 130 of the bottom pan 100, such that the sidewall 210 extends more shallower than the sidewall of the bottom pan 100. This causes the loaf pan to wobble while placed in the bottom pan and leads to more spills and injuries.

Figure 3A:
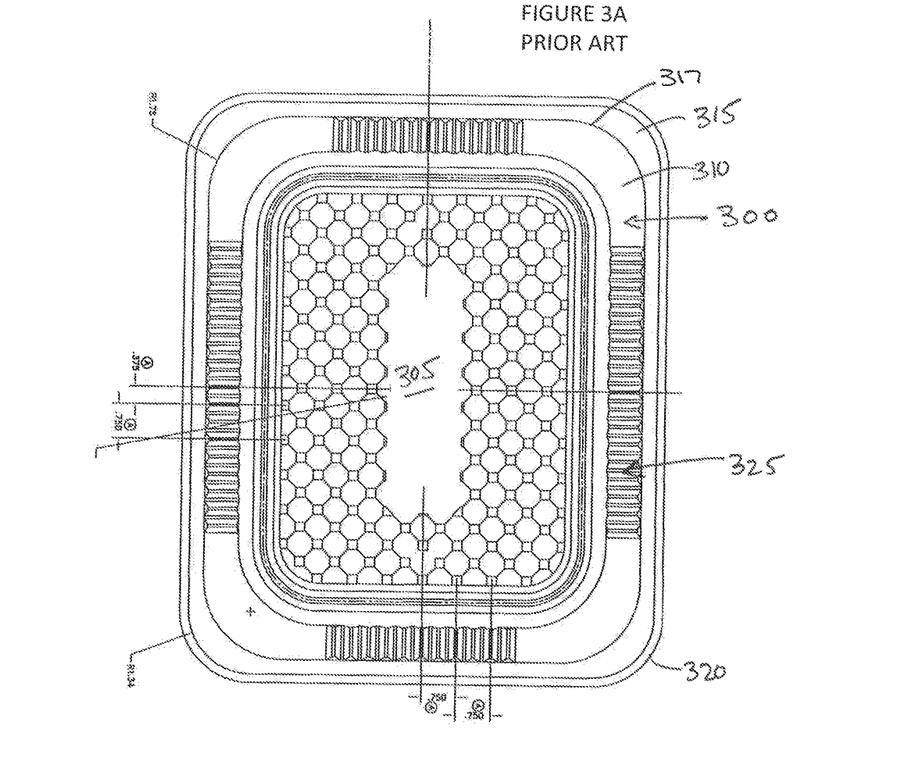
FIG. 3A is a top view of a Prior Art half-pan.
Figure 3B:
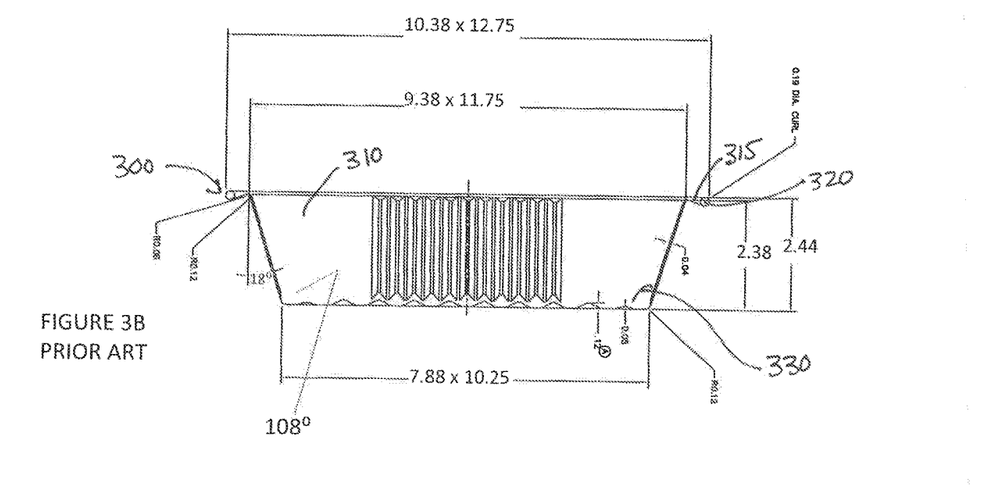
FIG. 3B is a side view of the Prior Art half-pan.
Figure 3C:
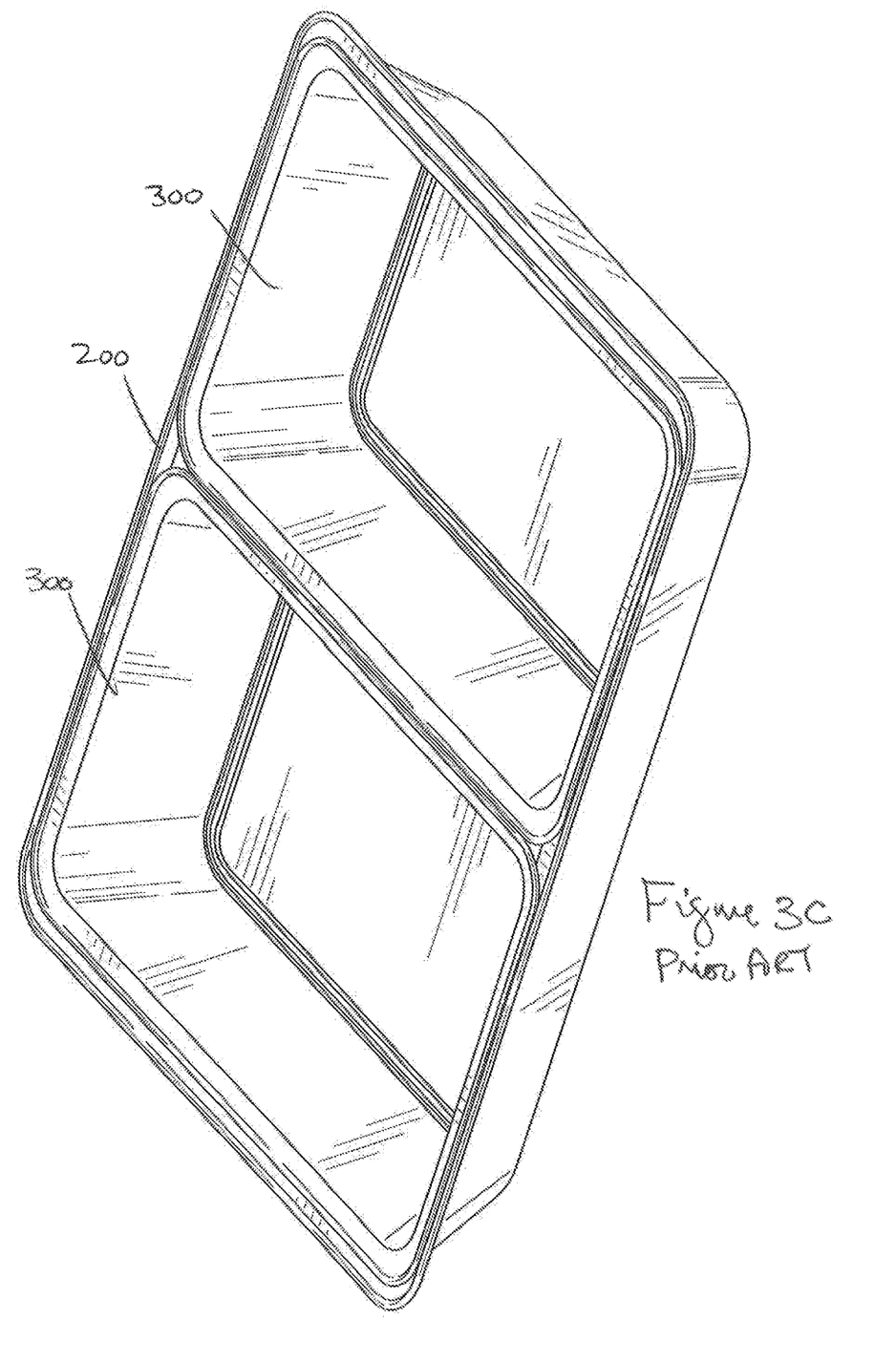
FIG. 3C is a perspective view of the 2 Prior Art half-pans nested within the Prior Art bottom pan from FIG. 1A.
Figure 3D:
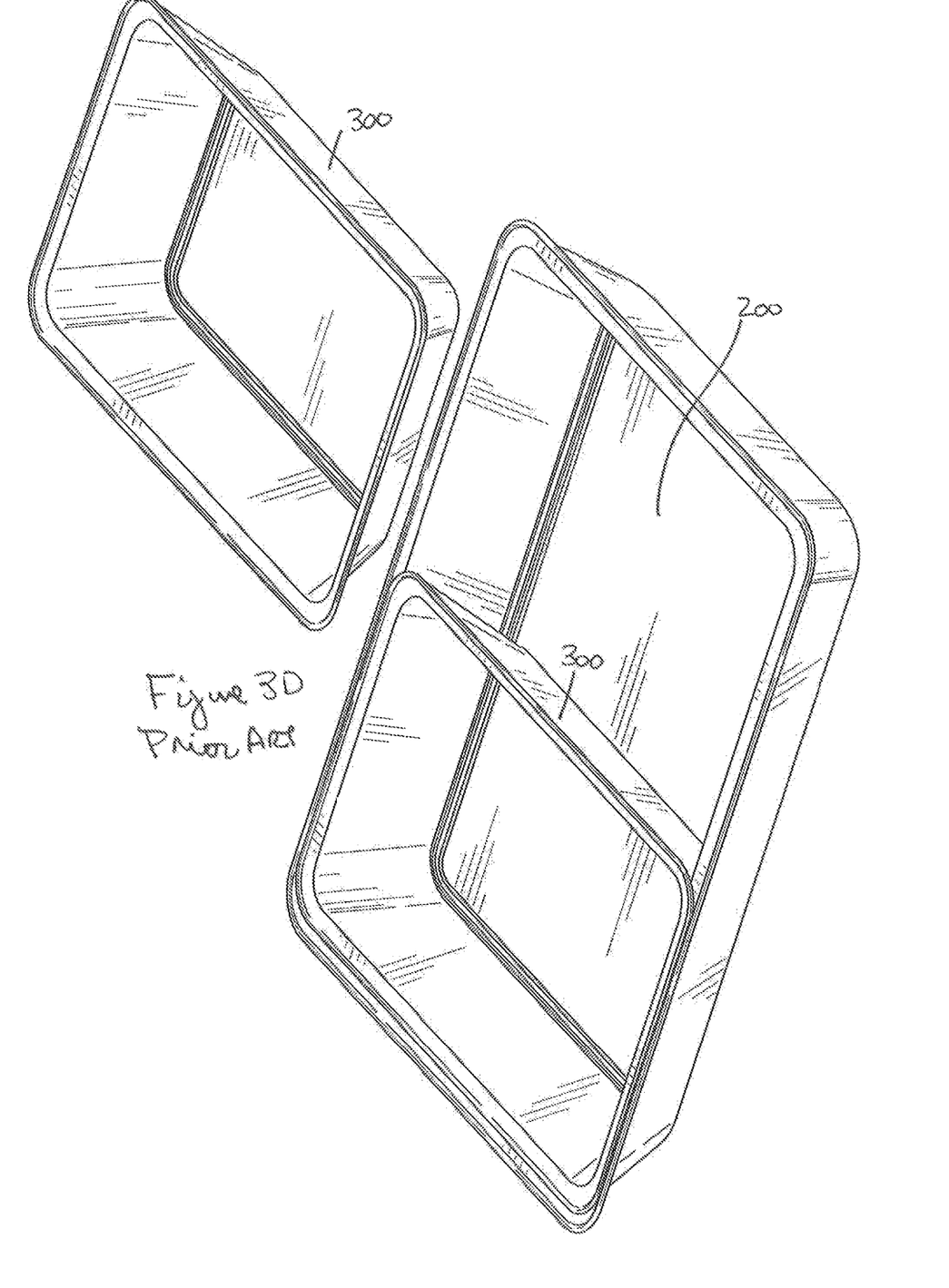
FIG. 3D is a perspective view of FIG. 3C and further illustrating one of the Prior Art half-pans separated from the others.
Figure 4A:
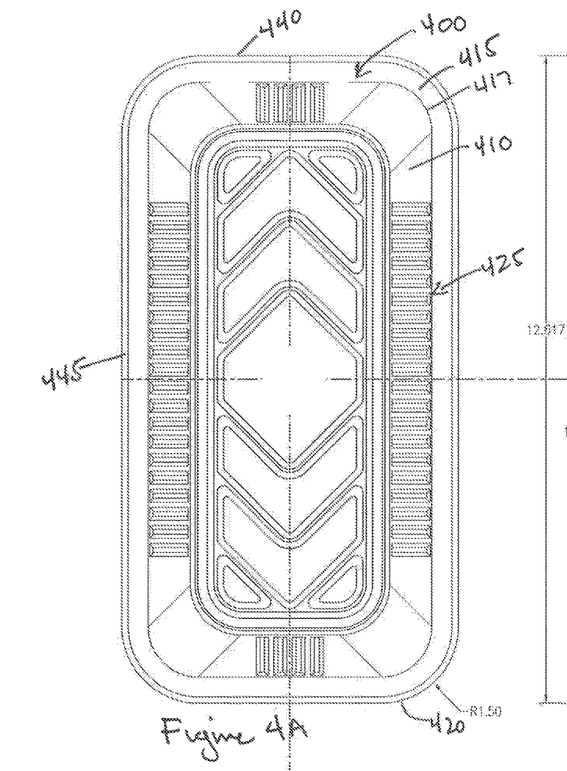
FIG. 4A is a new third-pan in accordance with one embodiment of the invention.
Figure 4B:
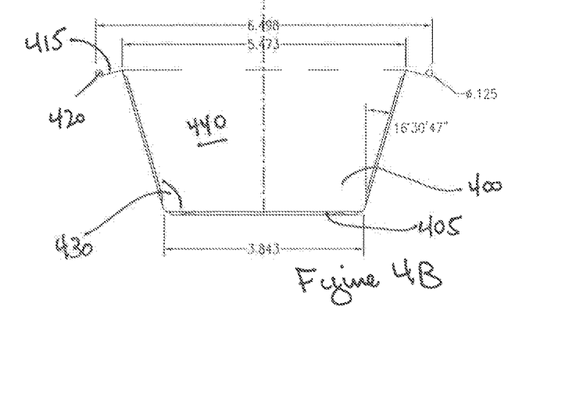
FIG. 4B is a one side view of the new third-pan from FIG. 4A.
Figure 4C:
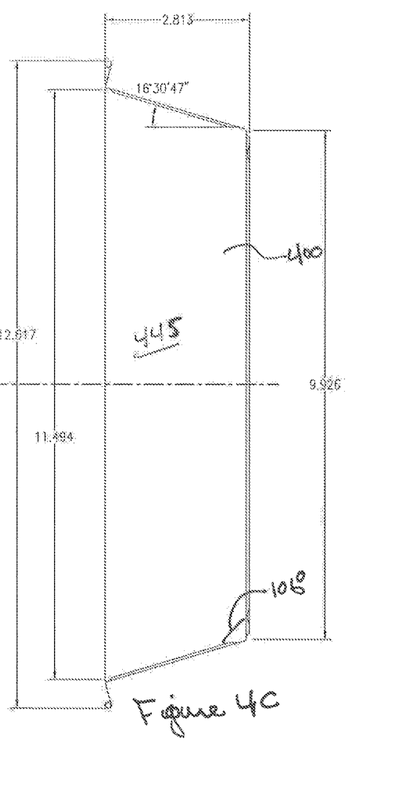
FIG. 4C is another side view of the new third-pan from FIG. 4A.
Figure 4D:
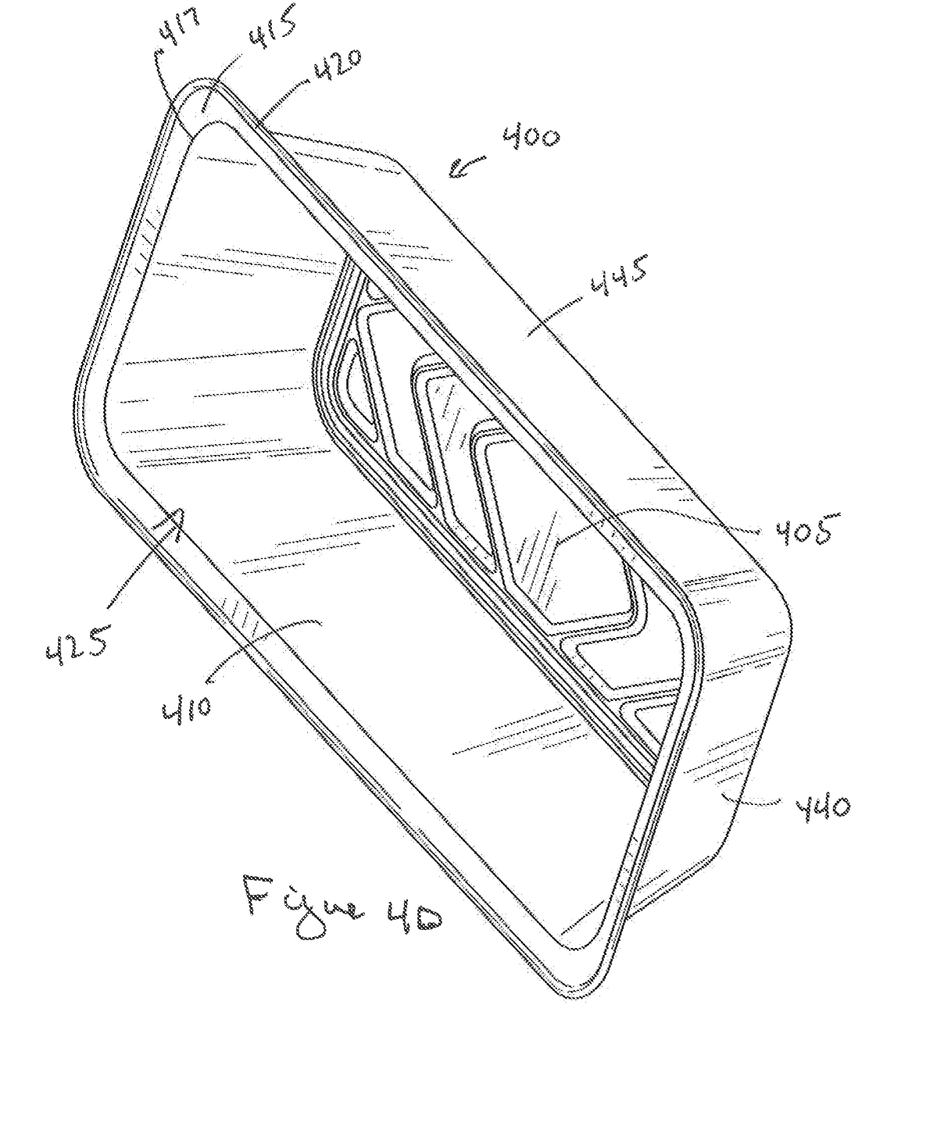
FIG. 4D is a perspective view of the new third-pan from FIG. 4A.

Continuing to refer to Prior Art FIGS. 1A and 1B and further reference to Prior Art FIGS. 3A and 3B, there is shown the industry standard for half-pans 300 used in connection with the bottom pans 100. As provided herein, the half-pan 300 includes a half-pan base 305 that terminates to an upwardly extending continuous sidewall 310. Surrounding a top portion of the sidewall 310 is an outstanding rim 315 that terminates to a rolled bead 320. The approximate dimensions of the half-pan are 7.88"×10.25" and the approximate dimensions of the interior 325 of the half-pan 300 taken from the inside edge 317 of the outstanding rim 315 is 9.38"×11.75". With a height of approximately 2.38" the inside angle 330 between the half-pan base 305 and the upwardly extending continuous sidewall 310 is about 108°. As shown in Prior Art FIGS. 3C and 3D the half-pans 300 nest in the bottom pan such that the outstanding rims 315 rest against the rims 115 of the bottom pan. This prevents the half-pans from being unstable and helps reduce spills and accidents.

Having outlined the problems in the prior art and how the prior art solves this problems, the present invention is thus directed to a new and novel third-pan illustrated in FIGS. 4A through 4D and generally referenced as numeral 400. The third-pan includes a third-pan base 405 that terminates to an upwardly extending third-pan continuous sidewall 410. Surrounding a top portion of the third-pan sidewall 410 is an outstanding third-pan rim 415 that terminates to a third-pan rolled bead 420. The approximate dimensions of the third-pan base are 3.84"×9.93" and the approximate dimensions of the interior 425 of the third-pan 400 taken from the inside edge 417 of the outstanding third-pan rim 415 is 5.47"×11.49"; at the outside edge 422 of the rim 415 the approximate dimensions are 6.50"×12.62". With a height of approximately 2.81" the inside angle 430 between the third-pan base 405 and the upwardly extending continuous third-pan sidewall 410 is about 106°. In addition, for clarity purposes, the third-pan includes a short side 440 and a long side 445.

In general, a number of factors work in concert to provide for the novel the third-pan. Some of which include (a) the height of the third-pan continuous sidewall of is less then the height of the sidewall of the bottom pan; (b) the third-pan inside angle is within two degrees of the inside angle of the bottom pan and in some embodiments the third-pan inside angle may be approximately the same as the inside angle of the bottom pan; (c) the dimensions of the short side of the third-pan about the outside edge of the rim extend such that the third-pan rim along the short side of the third-pan rests on the rim of the bottom pan; and (d) the dimensions of the short side of the third-pan permit at least three third-pans to nest side by side within the bottom pan.

Figure 5A:
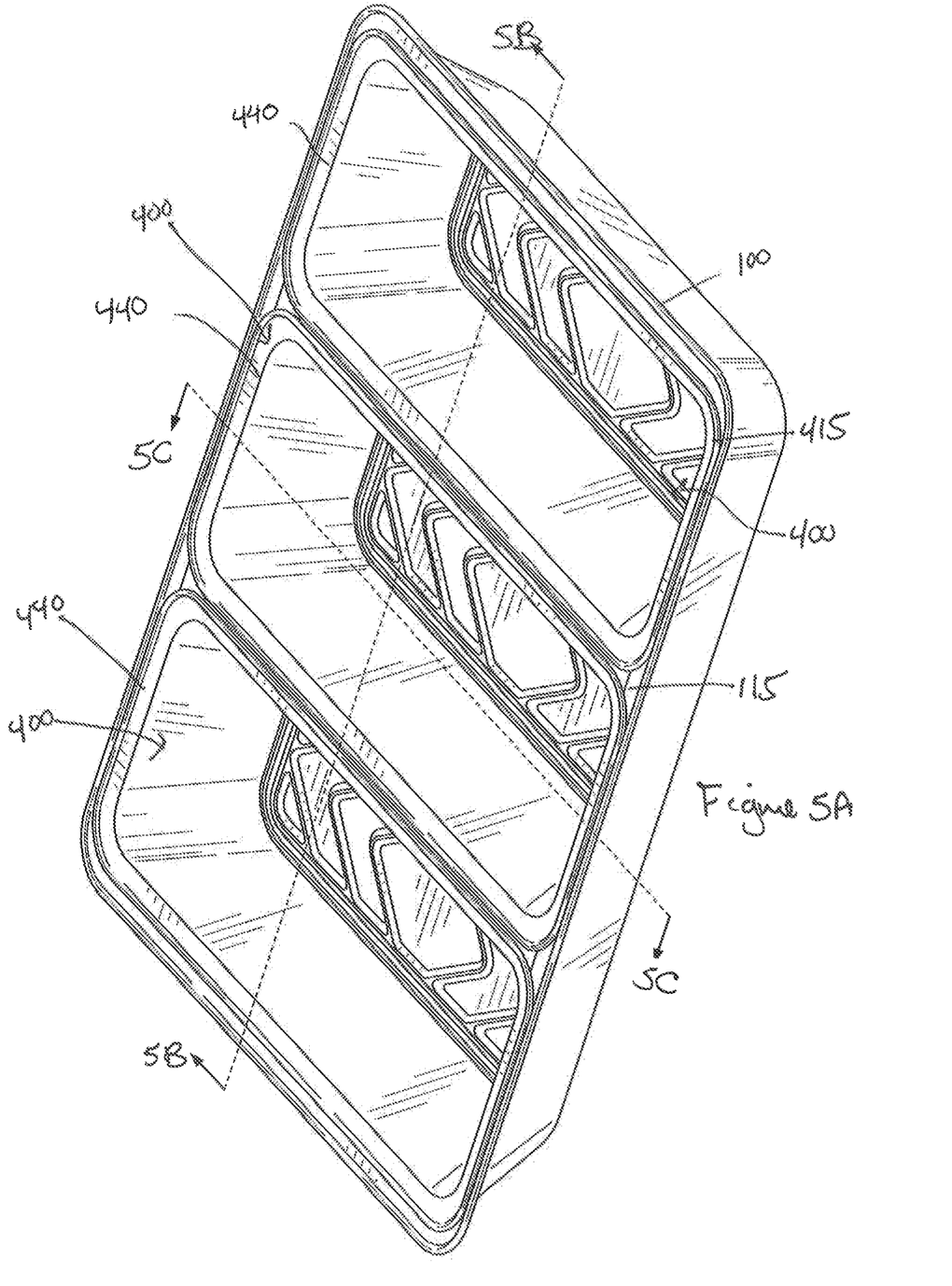
FIG. 5A is a perspective view of the new third-pans nested within the bottom pan from FIG. 1A.
Figure 5B:
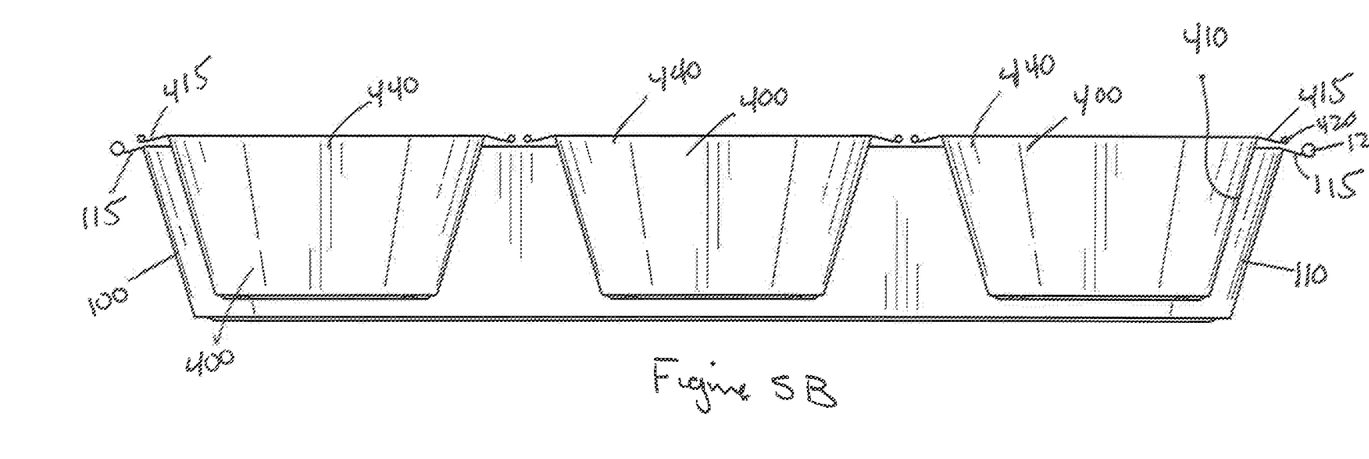
FIG. 5B is first cross sectional view of FIG. 5A taken along line 5B-5B.
Figure 5C:
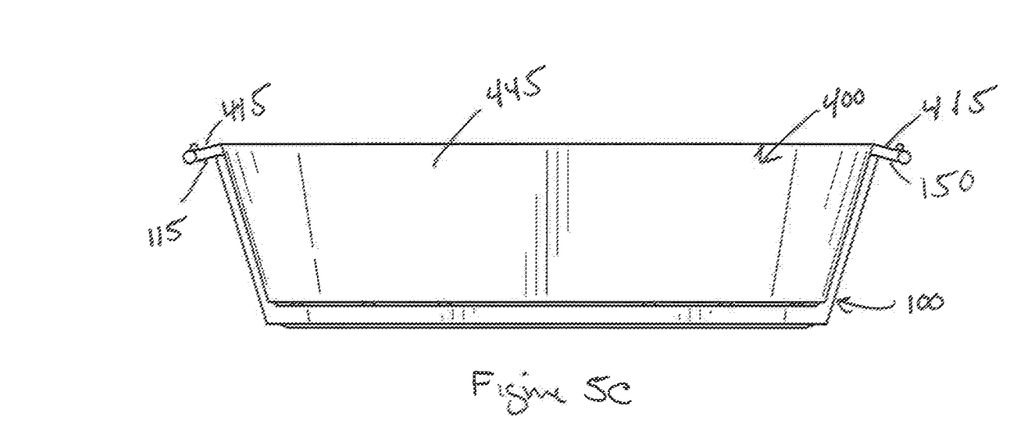
FIG. 5C is second cross sectional view of FIG. 5A taken along line 5C-5C.
Figure 6:
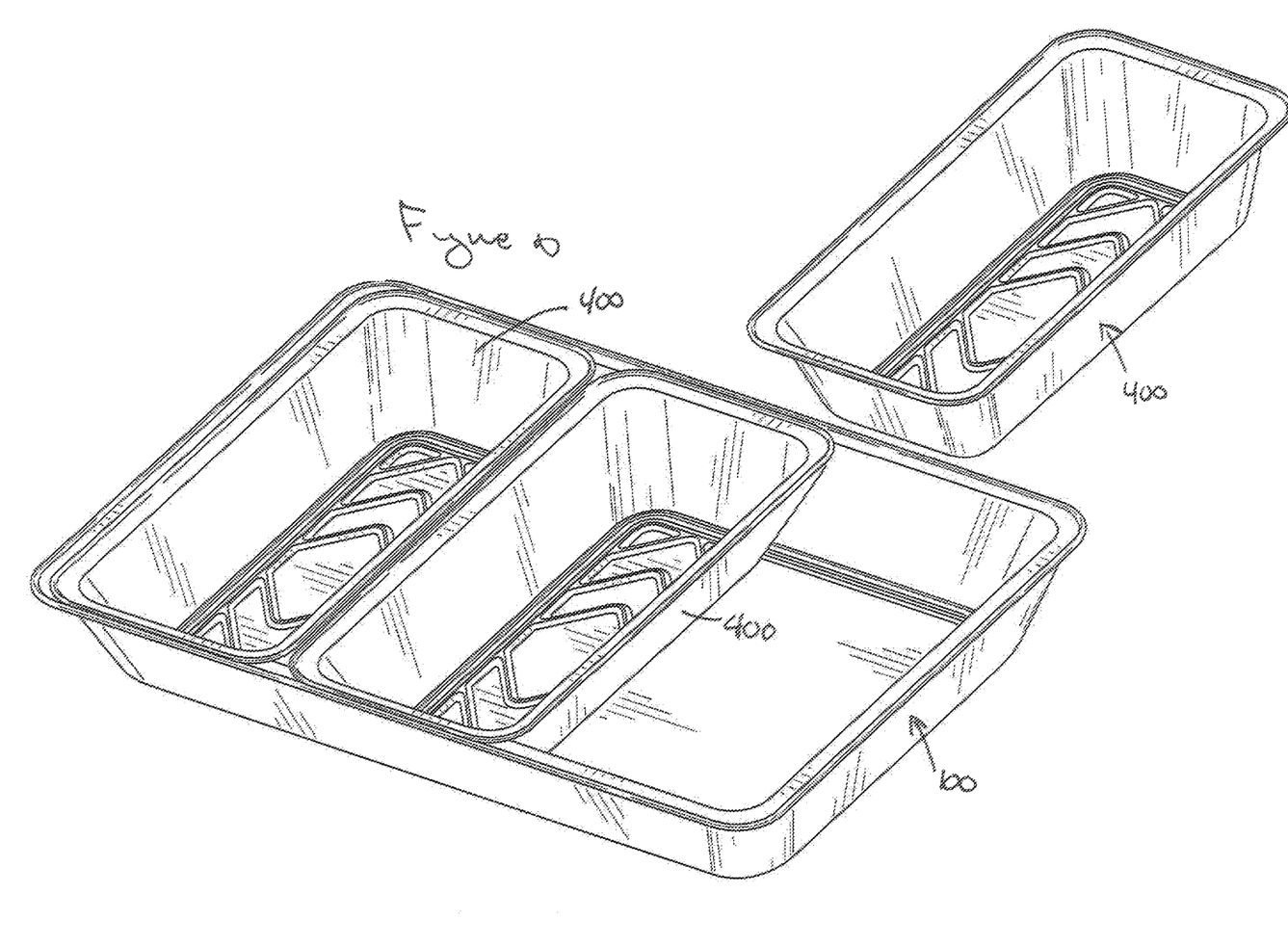
FIG. 6 is a perspective view of the new third-pans nested within the bottom pan from FIG. 1A and further illustrating one of the new third-pans separated from the others.

Referring now to FIGS. 5A-6 the third-pans nest properly in the bottom pan helping to reduce spills and injury.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A combination of nested pans for use in warming and cooking foods, comprising:

a first pan having a first base portion terminating to an upwardly extending continuously surrounding first wall, the upwardly extending first wall has an upper edge that extends outwardly to a first rim and wherein the first rim has a first rolled bead at its peripheral edge, and wherein the upwardly extending first wall of the first pan is defined to include a pair of oppositely positioned first pan endwalls and a pair of oppositely positioned first pan sidewalls interspaced between the pair of first pan endwalls, wherein the pair of first pan endwalls are shorter than the pair of first pan sidewalls, and wherein the upwardly extending first wall further has a first height, and the first pan further having a first inside angle defined between the first base portion of the upwardly extending first wall and wherein the first pan is made of stamped aluminum foil having a first wall thickness of about 0.05 inches; and a second pan made of aluminum foil and having a second base portion terminating to an upwardly extending continuously surrounding second wall, the upwardly extending second wall has an upper edge that extends outwardly to a second rim and wherein the second rim has a second rolled bead at its peripheral edge, and the second pan further having a second inside angle defined between the second base portion of the upwardly extending second wall, and wherein the continuously surrounding second sidewall defines a pair of oppositely positioned second pan endwalls and a pair of oppositely positioned second pan sidewalls interspaced between the second pan endwalls, and wherein the second pan endwalls are shorter than the second pan sidewalls and wherein:

(i) the upwardly extending second wall of the second pan has a second height less than the first height of the first pan, (ii) the second inside angle is smaller than the first inside angle by approximately one degree, (iii) a second pan sidewall length is configured at a dimension smaller than the first pan endwalls to cause a portion of the second rim along the second pan endwall to rest on a portion of the first rim along the first pan sidewall and wherein a portion of the second bead defined along the second pan endwall rests adjacent to and nonoverlapping a portion of the first bead defined along the first pan sidewall, and (iv) a second pan endwall length with the second rim is configured to allow three similarly configured second pans to nest side by side within the first pan, defining an inside pan and two outside pans, wherein the two outside pans lay adjacent to the inside pan, and wherein a portion of the second bead defined along either sidewall of the inside pan rests adjacent to and nonoverlapping to a portion of the second bead defined along the sidewall of both of the two outside pans, and and the second pan endwall length is further configured such that outer second rims of the sidewalls defined on the two outside pans rest on a portion of the first rim along the first pan endwalls and wherein a portion of the second bead defined along the sidewalls on the two outside pans rest adjacent to a portion of the first bead defined along the first pan endwalls.

2. A combination of nested pans for use in warming and cooking foods, comprising:

a first pan having a first base portion terminating to an upwardly extending continuously surrounding first wall, the upwardly extending first wall has an upper edge that extends outwardly to a first rim and wherein the first rim has a first roiled bead at its peripheral edge, and wherein the upwardly extending first wall of the first pan is defined to include a pair of oppositely positioned first pan endwalls and a pair of oppositely positioned first pan sidewalls interspaced between the pair of first pan endwalls, wherein the pair of first pan endwalls are shorter than the pair of first pan sidewalls, and wherein the upwardly extending first wall further has a first height, and the first pan further having a first inside angle defined between the first base portion of the upwardly extending first wall and wherein the first pan is made of stamped aluminum foil; and a second pan made of stamped aluminum foil and having a second base portion terminating to an upwardly extending continuously surrounding second wall, the upwardly extending second wall has an upper edge that extends outwardly to a second rim and wherein the second rim has a second rolled bead at its peripheral edge, and the second pan further having a second inside angle defined between the second base portion of the upwardly extending second wall, and wherein the continuously surrounding second sidewall defines a pair of oppositely positioned second pan endwalls and a pair of oppositely positioned second pan sidewalls interspaced between the second pan endwalls, and wherein the second pan endwalls are shorter than the second pan sidewalls and wherein:

(i) the upwardly extending second wall of the second pan has a second height less than the first height of the first pan, (ii) the second inside angle is smaller than the first inside angle, (iii) a second pan sidewall length is configured at a dimension smaller than the first pan endwalls to cause a portion of the second rim along the second pan endwall to rest on a portion of the first rim along the first pan sidewall and wherein a portion of the second bead defined along the second pan endwall rests adjacent to and nonoverlapping a portion of the first bead defined along the first pan sidewall, and (iv) a second pan endwall length with the second rim is configured to allow three similarly configured second pans to nest side by side within the first pan, defining an inside pan and two outside pans lying adjacent to either sidewall of the inside pan, and wherein a portion of the second bead defined along either sidewall of the inside pan rests adjacent to and nonoverlapping to a portion of the second bead defined along the sidewall of both of the two outside pans, and the second pan endwall length is further configured such that outer second rims of the sidewalls defined on the two outside pans rest on a portion of the first rim along the first pan endwalls and wherein a portion of the second bead defined along the sidewalk on the two outside pans rest adjacent to a portion of the first bead defined along the first pan endwalls.

* * * * *